(12) United States Patent
Hersche et al.

(10) Patent No.: US 9,896,573 B2
(45) Date of Patent: Feb. 20, 2018

(54) COMPOSITION FOR BLOW MOLDING

(75) Inventors: Emil Hersche, Wollerau (CH); René Burkhalter, Herzogenbuchsee (CH)

(73) Assignee: Omya International AG, Oftringen (CH)

(\*) Notice: Subject to any disclaimer, the term of this patent is extended or adjusted under 35 U.S.C. 154(b) by 147 days.

(21) Appl. No.: 13/639,114

(22) PCT Filed: Apr. 11, 2011

(86) PCT No.: PCT/EP2011/055646
§ 371 (c)(1),
(2), (4) Date: Nov. 9, 2012

(87) PCT Pub. No.: WO2011/128305
PCT Pub. Date: Oct. 20, 2011

(65) Prior Publication Data
US 2013/0129950 A1 May 23, 2013

Related U.S. Application Data

(60) Provisional application No. 61/342,748, filed on Apr. 19, 2010.

(30) Foreign Application Priority Data

Apr. 12, 2010 (EP) .................... 10159648

(51) Int. Cl.
| | |
|---|---|
| C08L 23/06 | (2006.01) |
| C08L 23/12 | (2006.01) |
| B29C 49/00 | (2006.01) |
| B29C 49/04 | (2006.01) |
| B29C 49/06 | (2006.01) |
| B29K 23/00 | (2006.01) |
| B29K 105/16 | (2006.01) |
| B29L 31/00 | (2006.01) |
| C08K 3/00 | (2018.01) |
| C08L 23/14 | (2006.01) |
| C08L 23/16 | (2006.01) |

(52) U.S. Cl.
CPC ............. *C08L 23/06* (2013.01); *C08L 23/12* (2013.01); *B29C 49/0005* (2013.01); *B29C 49/04* (2013.01); *B29C 49/06* (2013.01); *B29K 2023/065* (2013.01); *B29K 2023/12* (2013.01); *B29K 2105/16* (2013.01); *B29L 2031/716* (2013.01); *B29L 2031/7158* (2013.01); *C08K 3/0033* (2013.01); *C08L 23/14* (2013.01); *C08L 23/16* (2013.01); *C08L 2203/10* (2013.01); *C08L 2205/03* (2013.01); *C08L 2207/02* (2013.01); *Y10T 428/1352* (2015.01)

(58) Field of Classification Search
CPC .......... Y10T 428/1352; B29K 2105/16; C01F 11/18; C01F 11/182; C01F 11/183; C09C 1/021; C08K 3/26
USPC ....... 428/35.7, 216, 218, 516; 524/423, 427, 524/240, 400, 451, 528, 449, 433
See application file for complete search history.

(56) References Cited

U.S. PATENT DOCUMENTS

| | | | |
|---|---|---|---|
| 2003/0216518 A1* | 11/2003 | Tau et al. ...................... | 525/191 |
| 2007/0197710 A1* | 8/2007 | Wu et al. ....................... | 524/445 |
| 2007/0203300 A1 | 8/2007 | Sumi et al. | |
| 2010/0255232 A1* | 10/2010 | Duguid et al. ............... | 428/35.2 |

FOREIGN PATENT DOCUMENTS

| | | |
|---|---|---|
| EP | 0454870 A1 | 5/1991 |
| EP | 2145923 A1 | 1/2010 |
| JP | 59157136 A | 9/1984 |
| JP | 6038448 A | 2/1985 |
| JP | 10315359 A | 12/1998 |
| JP | 200616550 A | 1/2006 |
| WO | 9910424 A1 | 3/1999 |
| WO | 0039222 A1 | 7/2000 |
| WO | 0078858 A2 | 12/2000 |
| WO | WO 0132787 A1 * | 5/2001 |
| WO | 0192403 A2 | 12/2001 |
| WO | 04083316 A1 | 9/2004 |
| WO | WO 2005005143 A1 * | 1/2005 |
| WO | 0512157 A2 | 12/2005 |
| WO | WO 2007078454 A2 * | 7/2007 |
| WO | 09074492 A1 | 6/2009 |

OTHER PUBLICATIONS

Dow Chemicals Co. "Inspire 114—Performance Polymer EU", Nov. 2007, p. 1.*
Ciullo, Peter A. Industrial Minerals and Their Uses: A Handbook and Formulary. Westwood, NJ: Noyes Publications, 1996, p. 25.*
The International Search Report, dated Jun. 17, 2011 for PCT Application No. PCT/EP2011/055646.
The Written Opinion of the International Searching Authority, dated Jun. 17, 2011 for PCT Application No. PCT/EP2011/055646.
Office Action dated Sep. 9, 2014 for Japanese Application No. 2013-504231.
Office Action dated Feb. 13, 2017 for Korean Application No. 10-2012-7029619.

\* cited by examiner

*Primary Examiner* — Lee E Sanderson
(74) *Attorney, Agent, or Firm* — Amster, Rothstein & Ebenstein LLP

(57) ABSTRACT

The present invention relates to a composition, comprising (i) a polypropylene having a melt flow index MFI(230° C., 2.16 kg) of less than 2.0 g/10 min, a flexural modulus of from 1200 to 2400 MPa, a density of from 0.895 to 0.910 g/cm$^3$, (ii) a high-density polyethylene, and (iii) an inorganic filler.

17 Claims, No Drawings

US 9,896,573 B2

COMPOSITION FOR BLOW MOLDING

CROSS-REFERENCE TO RELATED APPLICATIONS

This application is a U.S. national phase of PCT Application No. PCT/EP2011/055646, filed Apr. 11, 2011, which claims priority to European Application No. EP 10159648.4, filed Apr. 12, 2010 and U.S. Provisional Application No. 61/342,748, filed Apr. 19, 2010.

The present invention relates to a composition which is useful for the preparation of blow-molded articles such as bottles.

Blow molding, in particular extrusion blow molding is a commonly known process for the preparation of bottles. Polyethylene is frequently used in extrusion blow molding as it has beneficial processability and enables to accomplish high extrusion rates without rupture or sagging of the polymer melt leaving the die.

For a number of applications, it is desired that the blow-molded article has high stiffness in order to obtain a high top load. However, to comply with this requirement, the maximum achievable stiffness of polyethylene materials still needs to be improved.

It is known that the presence of inorganic fillers may improve stiffness of a polymeric material such as polyethylene. Replacement of some polymer by inorganic fillers may also improve carbon footprint.

Another approach for improving stiffness properties is to partially replace polyethylene by polypropylene. However, in general high density polyethylene (HDPE) resins destined for blow molding applications have better processability (melt strength) than polypropylene. In other words, increasing the stiffness of a fractional MFI HDPE via the addition of a low MFI polypropylene having a higher stiffness than the respective HDPE is negatively impacting the melt strength of the molten polymer blend. Hence, melt blending of such HDPE and PP resins results in higher stiffness at the expense of processability. Therefore, it still remains a challenge to improve one of these properties while retaining the other property on a high level.

A further property which is relevant for blow molded articles is impact strength, i.e. the ability of a material to withstand shock loading. As mentioned above, it is known to add inorganic fillers for improving stiffness of a polymer composition. However, this might have a detrimental effect on impact strength. Thus, stiffness and impact strength can be conflicting properties.

Considering the above statements, it is an object of the present invention to provide a composition having an improved balance between processability, stiffness and impact properties. It is also an object of the present invention to provide a blow molded article which can be prepared by a standard blow molding process at higher efficiency (ie. higher output rate), and shows a good balance between stiffness and impact properties.

According to a first aspect of the present invention, the object is solved by providing a composition, comprising (i) a polypropylene having a melt flow index MFI(230° C., 2.16 kg) of less than 2.0 g/10 min, a flexural modulus of from 1200 to 2400 MPa, a density of from 0.895 to 0.910 g/cm$^3$, (ii) a high-density polyethylene having a melt flow index MFI(190° C., 2.16 kg) of from 0.1 to 2.0 g/10 min, (iii) an inorganic filler.

Preferably, the composition according to the first aspect of the present invention has a melt strength of at least 20 cN.

According to a second aspect of the present invention, the object is solved by providing a composition comprising (i) a polypropylene, (ii) a high-density polyethylene, (iii) an inorganic filler, wherein the composition has a melt strength of at least 20 cN.

Preferably, the polypropylene being present in the composition according to the second aspect of the present invention has a melt flow index MFI(230° C., 2.16 kg) of less than 2.0 g/10 min, a flexural modulus of from 1200 to 2400 MPa, and a density of from 0.895 to 0.910 g/cm$^3$.

Preferably, the high-density polyethylene being present in the composition according to the second aspect of the present invention has a melt flow index MFI(190° C., 2.16 kg) of from 0.1 to 2.0 g/10 min.

If a blend of components (i) to (iii) which comply with the requirements defined above for the first and second aspect of the present invention is used, the resultant composition shows good processability, in particular in a blow molding process, while still providing high stiffness and impact strength. Blow molded articles prepared from these blends such as bottles show beneficial properties such as high top load.

High melt strength improves processability, i.e. the polymer can be processed at higher extrusion rates without rupture and/or sagging of the polymer melt leaving the die. Sagging is characterized as a local reduction in the diameter along the length of a parison as it becomes longer.

If not indicated otherwise, the following statements apply to both the first and second aspect of the present invention.

Preferably, the polypropylene has an MFI(230° C., 2.16 kg) of 1.8 g/10 min or less, more preferably of less than 1.0 g/10 min. In a preferred embodiment, the polypropylene has an MFI(230° C., 2.16 kg) of from 0.1 g/10 min to less than 2.0 g/10 min, more preferably of from 0.1 g/10 min to 1.8 g/10 min, even more preferably 0.3 to less than 1.0 g/10 min.

Melt flow index MFI (sometimes also referred to as melt flow rate MFR) is a measure of the ease of flow of a thermoplastic polymer melt. MFI is primarily related to molecular weight of a polymer. The higher the molecular weight of a polymer, the lower is melt flow rate.

In a preferred embodiment, the polypropylene has a flexural modulus of from 1200 to 2000 MPa.

Preferably, the polypropylene has a density of from 0.900 to 0.904 g/cm$^3$.

In a preferred embodiment, the polypropylene is a heterophasic polypropylene comprising a matrix made of a propylene homo- and/or copolymer and an elastomeric phase dispersed in the matrix.

If the matrix is made of a propylene copolymer, possibly in combination with a propylene homopolymer, said propylene copolymer preferably comprises comonomer units derived from ethylene and/or a $C_{4-8}$ alpha-olefin.

As known to the skilled person, the polypropylene forming the matrix can be prepared in a first polymerization reactor, possibly in combination with a second reactor in serial configuration, and can then be transferred to a subsequent polymerization reactor where the elastomeric phase, preferably a propylene-ethylene or propylene/$C_{4-8}$ alpha-olefin copolymer is prepared in the presence of the matrix polymer and intimately dispersed within the matrix.

In the present invention, the term "matrix" is to be interpreted in its commonly accepted meaning, i.e. it refers to a continuous phase (in the present invention a continuous propylene homo- or copolymer phase) in which isolated or discrete rubber domains (e.g. ethylene-propylene rubber EPR) are intimately dispersed.

Preferably, the propylene homo- and/or copolymer of the matrix has a crystallinity of at least 45%, more preferably at least 50%, as measured by differential scanning calorimetry (DSC).

In the present invention, the term "elastomeric phase" or "rubber domains" is to be interpreted in its commonly accepted meaning, i.e. it refers to a more or less amorphous rubber-like polymer phase.

Preferably, the elastomeric phase is a propylene/ethylene and/or propylene/$C_{4-8}$ alpha-olefin copolymer, such as an ethylene-propylene elastomer (EPR).

Preferably, the amount of the elastomeric phase in the heterophasic polypropylene is from 3 to 35 wt %, more preferably from 5 to 35 wt %, even more preferably from 5 to 25 wt % or from 5 to 15 wt %.

Preferably, the polypropylene, more preferably the heterophasic polypropylene has an amount of xylene cold solubles (XCS) of from 3 to 35 wt %, more preferably from 5 to 35 wt %, even more preferably from 5 to 25 wt % or from 5 to 15 wt %.

The amount of xylene cold solubles (XCS) is a parameter frequently used to determine the amount of elastomeric and/or amorphous components within a polymer composition (sometimes also referred to as xylene solubles XS). The measuring method is described in further detail below under the headline "Measuring Methods". As a first approximation, the amount of the xylene cold solubles XCS corresponds to the amount of rubber and the amount of those polymer chains of the matrix with low molecular weight and low stereoregularity.

Preferably the polypropylene, more preferably the heterophasic polypropylene has an amount of comonomer units derived from ethylene and/or a $C_{4-8}$ alpha-olefin of from 1.5 to 30 wt %, more preferably from 4 to 30 wt %, even more preferably of from 6 to 20 wt % or from 6 to 10 wt %.

In a preferred embodiment, the heterophasic polypropylene is modified by reaction with a coupling agent selected from an alkyl azide, an aryl azide, an azidoformate, a phosphoryl azide, a phosphinic azide, a silyl azide, or any mixture thereof. Preferably, the coupling agent is poly(sulfonyl azide).

With regard to appropriate coupling agents for reactive modification, reference can be made to WO 99/10424. Reference can also be made to WO 00/78858 and WO 2001/092403.

Preferably, the polypropylene has a melting point of at least 158° C., more preferably at least 160° C., even more preferably at least 162° C., measured by differential scanning calorimetry (DSC).

The polypropylene can be prepared using a catalyst known in the relevant technical field, such as a Ziegler-Natta catalyst or a single site catalyst (e.g. a metallocene catalyst or a constrained geometry catalyst). Preferably, a metallocene catalyst is used.

A polypropylene having the properties described above can be prepared by methods commonly known to the skilled person. Reference can be made e.g. to "*Propylene Handbook*", Hanser Publishers, 1996, pp. 220, E. P. Moore. A polypropylene having the properties described above is also commercially available, e.g. Inspire® 114 EU from The Dow Chemical Company and BorECO® BA2000 from Borealis. Reference can also be made to the heterophasic polypropylene described in EP 2 145 923 A1.

Preferably, the polypropylene is present in an amount of from 5 to 60 wt %, more preferably from 10 to 50 wt %, or from 10 to 40 wt %, or from 15 to 30 wt %, based on the total weight of the composition. Another preferred range is from 20 to 50 wt %, or from 30 to 50 wt %, based on the total weight of the composition.

In the context of the present invention, the term "high-density polyethylene" is used in accordance with its commonly accepted meaning and refers to a polyethylene which typically has a density of from 0.94 to 0.97 g/cm³.

In a preferred embodiment, the high-density polyethylene has a density within the range of 0.94 to 0.96 g/cm³.

Preferably, the high-density polyethylene has a melt flow index MFI(190° C., 2.16 kg) of from 0.1 to 1.0 g/10 min, more preferably from 0.1 to 0.8 g/10 min.

Preferably, the high-density polyethylene has a polydispersity Mw/Mn (i.e. the ratio of weight average molecular weight to number average molecular weight, indicating the breadth of molecular weight distribution) of from 2 to 15, more preferably from 5 to 15, or from 10 to 15.

Preferably, the high-density polyethylene is present in an amount of from 10 to 84 wt %, more preferably from 40 to 75 wt %, even more preferably from 48 to 63 wt %, or from 55 to 65 wt %, based on the total weight of the composition. Another preferred range is from 30 to 70 wt %, or from 40 to 60 wt %, based on the total weight of the composition.

High-density polyethylene can be prepared by methods commonly known to the skilled person and/or is commercially available.

As indicated above, the composition of the present invention contains an inorganic filler.

Preferably, the inorganic filler is selected from calcium carbonate, dolomite, talc, clay, or any mixture thereof.

If the inorganic filler comprises calcium carbonate, it can be natural ground calcium carbonate (GCC) or synthetic precipitated calcium carbonate (PCC), or a mixture thereof. GCC includes marble, limestone, chalk or mixtures thereof.

Natural ground calcium carbonate (GCC) or precipitated calcium carbonate (PCC) may be surface reacted to form a surface-reacted calcium carbonate, which are materials comprising GCC and/or PCC and an insoluble, at least partially crystalline, non-carbonate calcium salt extending from the surface of at least part of the calcium carbonate. Such surface-reacted products may, for example, be prepared according to WO 00/39222, WO 2004/083316, WO 2005/121257, WO 2009/074492.

Preferably, the inorganic filler, more preferably the calcium carbonate and/or dolomite, has/have a median particle diameter $d_{50}$ of from 0.5 to 5 μm, more preferably from 0.5 to 4 μm, even more preferably of from 1 to 3 μm.

Preferably, the inorganic filler, more preferably the calcium carbonate and/or dolomite, has/have a BET specific surface area (preferably measured before any treatment of said inorganic filler) of from 1 to 15 m²/g, more preferably of from 2 to 10 m²/g, even more preferably from 3 to 5 m²/g.

Preferably, the inorganic filler, more preferably the calcium carbonate and/or dolomite, has/have a $d_{98}$ of from 3 to 30 μm, more preferably of from 4 to 20 μm, even more preferably from 5 to 10 μm.

Preferably, less than 15 wt % of particles of the inorganic filler feature a diameter of less than 0.5 μm.

Preferably, the inorganic filler has a moisture content of less than 0.2 wt %.

Preferably, the calcium carbonate and/or dolomite is/are surface-treated with a hydrophobizing agent, i.e. at least a part of the surface area is covered by a hydrophobizing agent. In a preferred embodiment, the hydrophobizing agent is a $C_{8-24}$ fatty acid, or salt or ester thereof, such as stearic acid.

Preferably, the surface treated calcium carbonate and/or dolomite contains an amount of hydrophobizing agent such as a $C_{8-24}$ fatty acid in an amount of from 0.5 to 4 mg/m² of calcium carbonate and/or dolomite, more preferably 1 to 3 mg/m² of calcium carbonate and/or dolomite, even more preferably 1.5 to 2 mg/m² of calcium carbonate and/or dolomite.

Preferably, the inorganic filler is present in an amount of from 1 to 50 wt %, more preferably from 3 to 30 wt %, even more preferably from 5 to 30 wt %, or from 5 to 20 wt %, based on the total weight of the composition.

Preferably, the composition has a melt strength of at least 24 cN, more preferably at least 27 cN, even more preferably at least 29 cN, even further preferred at least 33 cN. In a preferred embodiment, the composition has a melt strength of from 20 to 60 cN, more preferably of from 24 to 56 cN, even more preferably of from 27 to 54 cN, even further preferred of from 29 to 54 cN, or from 33 to 54 cN.

Preferably, the composition has a drawability of less than 500 mm/s, more preferably of less than 470 mm/s. In a preferred embodiment, the composition has a drawability of from 450 to 50 mm/s, more preferably of from 400 to 50 mm/s.

Preferably, the composition has a melt flow index MFI (230° C., 2.16 kg) of 3 g/10 min or less, more preferably of 2 g/10 min or less, even more preferably 1 g/10 min or less. In a preferred embodiment, the composition has a melt flow index MFI(230° C., 2.16 kg) of from 0.1 g/10 min to 3 g/10 min, more preferably of from 0.2 g/10 min to 2 g/10 min, even more preferably of from 0.3 g/10 min to 1 g/10 min.

Preferably, the composition has an amount of xylene cold solubles (XCS) of from 0.2 wt % to 8 wt %, more preferably from 1 wt % to 7 wt %, even more preferably from 1.5 to 6 wt %.

Preferably, the composition has a notched Charpy impact strength at 23° C. of at least 20 kJ/m², more preferably at least 25 kJ/m², even more preferably at least 30 kJ/m². In a preferred embodiment, the composition has a notched Charpy impact strength at 23° C. within the range of 20 kJ/m² to 60 kJ/m², more preferably within the range of 25 to 50 kJ/m² or from 30 to 45 kJ/m².

Preferably, the composition has a tensile modulus of at least 900 MPa, more preferably at least 950 MPa, even more preferably at least 1000 MPa or even at least 1100 MPa.

In a preferred embodiment, the composition has a notched Charpy impact strength at 23° C. of at least 20 kJ/m² and a tensile modulus of at least 900 MPa, more preferably a notched Charpy impact strength at 23° C. of at least 25 kJ/m² and a tensile modulus of at least 950 MPa or even at least 1000 MPa.

The composition may also comprise optional additives such as coloring pigments like titanium dioxide or carbon black; processing additives such as siloxane masterbatches and/or fluoropolymer based processing additives; and/or antioxidants.

In a preferred embodiment, the composition does not contain a plasticizer.

The components described above can be blended by conventional mixing techniques (such as melt mixing in an extruder) commonly known to the skilled person.

According to a further aspect, the present invention provides the use of the composition as described above in a blow-moulding process.

Preferably, the composition is used for extrusion blow-moulding. However, it can also be used in other types of blow-moulding processes which are commonly known to the skilled person, such as injection blow-moulding, preferably injection stretch blow-moulding.

Appropriate process conditions for a blow molding method are commonly known to the skilled person and/or can be established by routine modifications based on common general knowledge.

The present invention also provides a blow-moulded article obtainable from the composition described above.

According to a further aspect, the present invention provides a blow-moulded article comprising the composition described above.

In a preferred embodiment, the blow-moulded article is a bottle, a wide-neck container, a canister or a drum.

The present invention will now be explained in further detail by making reference to the following examples.

EXAMPLES

A. Measuring Methods

If not otherwise indicated, the parameters mentioned in the present invention are measured according to the measuring methods described below.

A1. Melt flow index MFI(230° C., 2.16 kg) and MFI(190° C., 2.16 kg)

MFI(230° C., 2.16 kg) and MFI(190° C., 2.16 kg) were measured according to ISO 1133.

A2. Tensile Modulus

Tensile modulus was measured according to ISO 527-2/1BA/50 on 2 mm thick injection molded samples (major axis of test samples parallel to injection direction).

A3. Flexural Modulus

Flexural modulus was measured according to ISO 178 by using injection molded test specimens (major axis of test samples parallel to injection direction) (80×10×4 mm).

A4. Tensile Impact

Tensile impact was measured according to ISO 8256/3A. Test specimens were die-cut out of the extruded plates having a thickness of 0.7 to 0.8 mm.

A5. Density

Density was measured according to ISO 1183.

A6. Melt Strength, Drawability

Melt strength and drawability are measured by pulling strands of the molten polymer at constant acceleration until breakage occurs. The measurements were made on a Gottfert Rheotens apparatus.

The molten polymer strand obtained from an extruder is drawn uniaxially to a set of accelerating nips located below the die. The force required to uniaxially extend the strands is recorded as a function of the take-up velocity of the nip rolls. If a polymer melt shows draw resonance, the maximum force and velocity before the onset of draw resonance are taken as melt strength and drawability. If there is no draw resonance, melt strength corresponds to the to the maximum force attained during the measurement, and drawability corresponds to the velocity at which breakage occurs. The following measuring conditions were used: Temperature: 190° C.; output: 600 g/h; die: 30 mm/2.5 mm (die length/die diameter); acceleration: 24 mm/s²; spinline length: 100 mm.

A7. Crystallinity

Degree of crystallinity is measured by differential scanning calorimetry (DSC). In this measurement a small ten milligram sample of the propylene polymer is sealed into an aluminum DSC pan. The sample is placed into a DSC cell with a 25 cubic centimeter per minute nitrogen purge and cooled to about minus 100° C.

A standard thermal history is established for the sample by heating it at a rate of 10° C. per minute to 225° C. The sample is kept at 225° C. for 3 minutes to ensure complete melting. The sample then is cooled at a rate of 10° C. per minute to about −100° C. The sample is again kept isothermal at −100° C. for 3 minutes to stabilize. It is then reheated at the same rate of 10° C. per minute to 225° C. The observed heat of fusion ($\Delta H_{observed}$) for the second scan over a range of 80-180° C. is recorded.

The observed heat of fusion is related to the degree of crystallinity in weight percent based on the weight of the polypropylene sample by the following equation:

$$\text{Crystallinity \%} = (\Delta H_{observed})/(\Delta H_{iotactic\,pp}) \times 100$$

where the heat of fusion for isotactic polypropylene ($\Delta H_{iotactic\,pp}$) is reported in B. Wunderlich, Macromolecular Physics, Volume 3, Crystal Melting, Academic Press, New York, 1960, p 48, to be 165 Joules per gram (J/g) of polymer. The peak temperature of crystallization from the melt is determined by the DSC as above with a cooling rate of 10° C./min. The melting temperature is determined by the peak of the melting transition.

A8. Melting Point

The melting temperature is determined via DSC (heating rate: 10° C./min) by the peak of the melting transition.

A9. Comonomer Content

Comonomer content is determined by FTIR spectroscopy.

A10. Xylene Cold Soluble (XCS)

2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature (Xylene Cold Solubles—XCS) is then calculated. If the amount of xylene cold solubles of the final blend (i.e. the composition comprising the HDPE, PP and $CaCO_3$) is determined, 5.0 g of said blend are dissolved in 250 ml of xylene, all other measuring parameters mentioned above for the pure polymer component remaining the same.

A11. $d_{50}$ Value, $d_{98}$ Value

Throughout the present invention, $d_{50}$ is the medium particle size by weight, i.e. representing the particle size so that 50 wt % of the particles are coarser or finer. Accordingly, $d_{98}$ represents the particle size so that 98 wt % of the particles are finer, i.e. have a particle size below said $d_{98}$ value.

Particle size was measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

A12. Specific Surface Area (BET)

The specific surface area was measured using nitrogen and the BET method according to ISO 9277.

A13. Notched Charpy Impact Strength

Notched Charpy impact strength was measured according to ISO 179-1/1eA on injection molded samples at 23° C.

A14. Moisture Content

Moisture content of the inorganic filler is determined by Karl Fischer titrimetry which is an accurate and well known moisture measurement method utilising the quantitative reaction of water with iodine. This method is widely used as the standard method of moisture measurement because of its high selectivity and sensitivity.

In coulometric Karl Fischer titration, the sample is added to a pyridine-methanol solution (with iodine and sulfur dioxide as principal components). The iodine, generated electrolytically at the anode, reacts with the water in the sample. Iodine is generated in direct proportion to the quantity of electric charge, according to Faradays' Law. One mole of iodine reacts with and equates quantitatively to one mole of water. Therefore, 1 mg of water is equivalent to 10.71 Coulombs. Based on this principle, water content can be directly determined from the quantity of electric charge required for electrolysis.

A15. Molecular Weight, Polydispersity Mw/Mn

Determined by gel permeation chromatography.

B. Preparation and Testing of Samples

In Examples E1-E7 and Comparative Examples CE1-CE2, the following samples were prepared:

Comparative Example 1 (CE 1) was exclusively based on high-density polyethylene, which had a density of 0.96 g/cm³. The HDPE is commercially available under the trade name DOW HDPE 35060E.

In Comparative Example 2 (CE 2), calcium carbonate was added to the HDPE of CE 1. The final sample contained 6.5 wt % calcium carbonate. The blend was prepared by providing the calcium carbonate in the form of a master batch (65 wt % of $CaCO_3$ in HDPE) and melt mixing the master batch and the HDPE in an extruder.

The calcium carbonate was a GCC, treated with approximately 0.5% by weight of stearic acid, which had the following properties: $d_{50}$=approximately 1.6 μm.

BET surface area (before stearic acid treatment)=approximately 4 m²/g

The samples of Examples 1 to 7 contained HDPE, calcium carbonate and a polypropylene in varying mixing ratios. The HDPE and calcium carbonate were those used in CE 1-2 as well.

The polypropylene had a flexural modulus of 1600 MPa, a density of 0.900 g/cm³, a melt flow index MFI(230° C., 2.16 kg) of 0.5 g/10 min, an amount of xylene cold soluble (XCS) of 11 wt %. The polypropylene is commercially available under the trade name INSPIRE® 114.

In Examples 1 to 4, the amount of calcium carbonate was fixed to 6.5 wt % whereas the weight ratio of HDPE and polypropylene was varied.

Properties of the samples according to CE1-2 and E1-4 are shown in Table 1:

TABLE 1

Samples according to CE1-2 and E1-4

|  | CE1 | CE2 | E1 | E2 | E3 | E4 |
|---|---|---|---|---|---|---|
| $CaCO_3$ (wt %) |  | 6.5 | 6.5 | 6.5 | 6.5 | 6.5 |
| HDPE (wt %) | 100 | 93.5 | 83.5 | 78.5 | 73.5 | 63.5 |
| Polypropylene (wt %) |  |  | 10 | 15 | 20 | 30 |
| Melt strength (cN) | 26.3 | 25.1 |  |  |  | 33.1 |
| Tensile Modulus (MPa) | 898 | 1118 | 1061 | 1120 | 1191 | 1235 |

TABLE 1-continued

Samples according to CE1-2 and E1-4

|  | CE1 | CE2 | E1 | E2 | E3 | E4 |
|---|---|---|---|---|---|---|
| Notched Charpy impact strength at 23° C. (kJ/m$^2$) | 22.9 | 16.8 | 33.1 | 34.8 | 35.7 | 26.7 |

The data of CE1 and CE2 demonstrate that stiffness of HDPE can be improved by adding calcium carbonate as an inorganic filler. However, the improvement of stiffness is accomplished on the expense of impact strength which is significantly reduced.

In Examples 5 to 7, the amount of polypropylene was fixed to 30 wt %, whereas the amount of calcium carbonate was increased up to 26 wt %. In Table 2, the weight fractions of the components of each sample are indicated. Furthermore, the increase in tensile modulus and notched Charpy impact strength in comparison to E4 is indicated as well.

TABLE 2

Samples according to E5-7

|  | E5 | E6 | E7 |
|---|---|---|---|
| CaCO$_3$ (wt %) | 13 | 19.5 | 26 |
| HDPE (wt %) | 57 | 50.5 | 44 |
| Polypropylene (wt %) | 30 | 30 | 30 |
| Increase (%) in Tensile Modulus over E4 | 6% | 16% | 16% |
| Increase (%) in notched Charpy impact strength at 23° C. over E4 | 6% | 45% | 68% |

The data of Table 2 demonstrate that an increase of the amount of calcium carbonate in the blend of the present invention results in a further improvement of stiffness and notched Charpy impact strength.

In Examples E8 and E9, blends containing the following components in varying amounts have been prepared:
The high-density polyethylene already used in Examples E1-E7,
the calcium carbonate already used in Examples E1-E7, and
a polypropylene having a flexural modulus of 2000 MPa, a density of 0.900 g/cm$^3$ and a melt flow index MFI (230° C., 2.16 kg) of 0.3 g/10 min.

In Example E10, a blend containing the high-density polyethylene, polypropylene, and CaCO$_3$ already used in Examples E1-E7 was prepared.

Properties of these samples are summarized in Table 3.

TABLE 3

Samples according to E8 and E9

|  | E8 | E9 | E10 |
|---|---|---|---|
| CaCO$_3$ (wt %) | 9.5 | 10.5 | 10.5 |
| HDPE (wt %) | 60.5 | 49.5 | 49.5 |
| Polypropylene (wt %) | 30 | 40 | 40 |
| Melt strength (cN) |  | 47.1 | 38.9 |
| Tensile modulus (MPa) | 1297 | 1362 | 1264 |
| Tensile-Impact test | 514 | 518 | 418 |
| Xylene cold solubles (wt %) |  | 2.5 | 5.3 |

Extrusion blow molded bottles were made from the materials of CE1 (100 wt % HDPE), CE2 (93.5 wt % HDPE, 6.5 wt % CaCO$_3$), and E9 (49.5 wt % HDPE, 40 wt % polypropylene, 10.5 wt % CaCO$_3$). The bottles were produced on a Krupp-Kautex KEB 4 device. The machine was equipped with a single cavity and a thickness-profile control unit. The following parameters were used to blow the bottles: Blow pressure: 8 bar; mold temperature: 15° C.; total cycletime: 24-25 seconds. Bottles having a nominal volume of 2.1 l and a weight of 73 g were produced. In bottles prepared from compositions containing CaCO$_3$, wall thickness was lower (less polymer material).

Top load was measured using a tensile testing machine with a testing speed of 50 mm/min on empty bottles (compression test). One of the plates was equipped with a hole for venting (no air compression in the bottle during testing). The test was stopped automatically when a drop of 10% in force was detected.

Top load results are shown below in Table 4

TABLE 4

| Top load | | | |
|---|---|---|---|
|  | Bottle prepared from CE1 | Bottle prepared from CE2 | Bottle prepared from E9 |
| Top load [N] | 307 | 291 | 312 |

Surprisingly, when adding to a blend of a high-density polyethylene and an inorganic filler (e.g. CaCO$_3$) a polypropylene which keeps melt strength of the final blend on a high level (at least 20 cN), this does not only maintain good processability of the final blend in a blow molding process but even results in an improved balance between processability, impact properties and stiffness. Blow molded articles such as bottles having an improved top load are obtainable from such a blend.

Furthermore, cost efficiency is improved as top load of blow molded articles such as bottles can be maintained on the same level with less polymer material.

The invention claimed is:

1. A blow molded article obtained from blow molding and cooling a melted blend of a composition comprising:
   10 to 40 wt. %, based on the total weight of the composition, of a polypropylene having
      a melt flow index MFI(230° C., 2.16 kg) of less than 2.0 g/10 min,
      a flexural modulus of from 1200 to 2400 MPa, and
      a density of from 0.895 to 0.910 g/cm$^3$,
   (ii) 40 to 84 wt. %, based on the total weight of the composition, of a high-density polyethylene having a density of 0.94 to 0.97 g/cm$^3$, and a melt flow index WI (190° C., 2.16 kg) of from 0.1 to 2.0 g/10 min, and
   (iii) 5 to 30 wt. %, based on the total weight of the composition, of an inorganic filler comprising calcium carbonate surface treated with a hydrophobizing agent, wherein the calcium carbonate has a median particle diameter d$_{50}$ of from 0.5 to 5 μm, a BET specific surface area of from 1 to 15 m$^2$/g before treatment with the hydrophobizing agent, and a d$_{98}$ value of from 3 to 30 μm,
   wherein the blow molded article has a melt strength of from 29 to 54 cN, a notched Charpy impact strength at 23° C. of from 25 to 50 kJ/m$^2$ and a tensile modulus of at least 1000 MPa.

2. The blow molded article according to claim 1, wherein the polypropylene is a heterophasic polypropylene comprising a matrix made of a propylene homo- and/or copolymer and an elastomeric phase dispersed in the matrix.

3. The blow molded article according to claim 2, wherein the elastomeric phase is a propylene-ethylene copolymer or a propylene/C$_{4-8}$ alpha-olefin copolymer.

4. The blow molded article according to claim 2, wherein the elastomeric phase is an ethylene-propylene rubber (EPR).

5. The blow molded article according to claim 2, wherein the heterophasic polypropylene has an amount of xylene cold solubles (XCS) of from 3 to 35 wt %.

6. The blow molded article according to claim 2, wherein the heterophasic polypropylene has an amount of comonomer units derived from ethylene and/or a $C_{4-8}$ alpha-olefin of from 1.5 to 30 wt %.

7. The blow molded article according to claim 1, wherein the polypropylene has a melting point of at least 158° C., measured by differential scanning calorimetry (DSC).

8. The blow molded article according to claim 1, wherein the high-density polyethylene has a polydispersity Mw/Mn of from 2 to 15.

9. The blow molded article according to claim 1, wherein the inorganic filler comprises calcium carbonate and one or more of dolomite, talc, and clay.

10. The blow molded article according to claim 1, wherein the inorganic filler is ground calcium carbonate (GCC) or precipitated calcium carbonate (PCC).

11. The blow molded article according to claim 1, wherein the hydrophobizing agent is a $C_{8-24}$ fatty acid.

12. The blow molded article according to claim 1, wherein the polypropylene is present in an amount of from 10 to 30 wt %, based on the total weight of the composition; the high-density polyethylene is present in an amount of from 40 to 75 wt %, based on the total weight of the composition; and the inorganic filler is present in an amount of from 5 to 20 wt %, based on the total weight of the composition.

13. The blow molded article according to claim 1, wherein the composition has an amount of xylene cold solubles (XCS) of from 0.2 wt % to 8 wt %, and/or a melt flow index MFI(230° C., 2.16 kg) of 3 g/10 min or less.

14. The blow molded article according to claim 1, wherein the blow molded article is a bottle, a wide-neck container, a canister or a drum.

15. The blow molded article according to claim 1, having a melt strength of from 33 to 54 cN.

16. The blow molded article according to claim 1, having a notched Charpy impact strength at 23° C. of from 30 to 45 $kJ/m^2$.

17. The blow molded article according to claim 1, having a tensile modulus of at least 1100 MPa.

* * * * *